United States Patent [19]

Taylor et al.

[11] 4,117,289
[45] Sep. 26, 1978

[54] SINGLE TANK MULTIBREAKER CIRCUIT INTERRUPTER

[75] Inventors: Maurice J. Taylor, Florence; Henry L. Peek, Brandon; John J. Abdou, Brandon; Amrut R. Patel, Brandon, all of Miss.

[73] Assignee: Allis-Chalmers Corporation, Milwaukee, Wis.

[21] Appl. No.: 843,457

[22] Filed: Oct. 19, 1977

Related U.S. Application Data

[63] Continuation of Ser. No. 635,158, Nov. 24, 1975, abandoned.

[51] Int. Cl.² .................................................. H01H 33/82
[52] U.S. Cl. ............................. 200/148 B; 200/148 R; 200/148 F
[58] Field of Search ........... 200/148 R, 148 B, 148 E, 200/148 F

[56] References Cited

U.S. PATENT DOCUMENTS

| 3,007,021 | 10/1961 | Prunty et al. | 200/148 B |
| 3,852,549 | 2/1978 | Goodwin, Jr. | 200/148 R |

Primary Examiner—Robert K. Schaefer
Assistant Examiner—Michael K. Mutter
Attorney, Agent, or Firm—Lee H. Kaiser

[57] ABSTRACT

A gas insulated circuit breaker is provided having a plurality of circuit interrupters disposed in a single enclosure. Each interrupter is provided with its own high pressure container located within the sealed enclosure; the high pressure container also operates as an insulating support for the associated interrupter. A single actuating rod passing through the interrupters operates the contacts and blast valves of all the interrupters simultaneously. Service means are provided for the insertion and withdrawal of the interrupters into and out of the enclosure.

2 Claims, 4 Drawing Figures

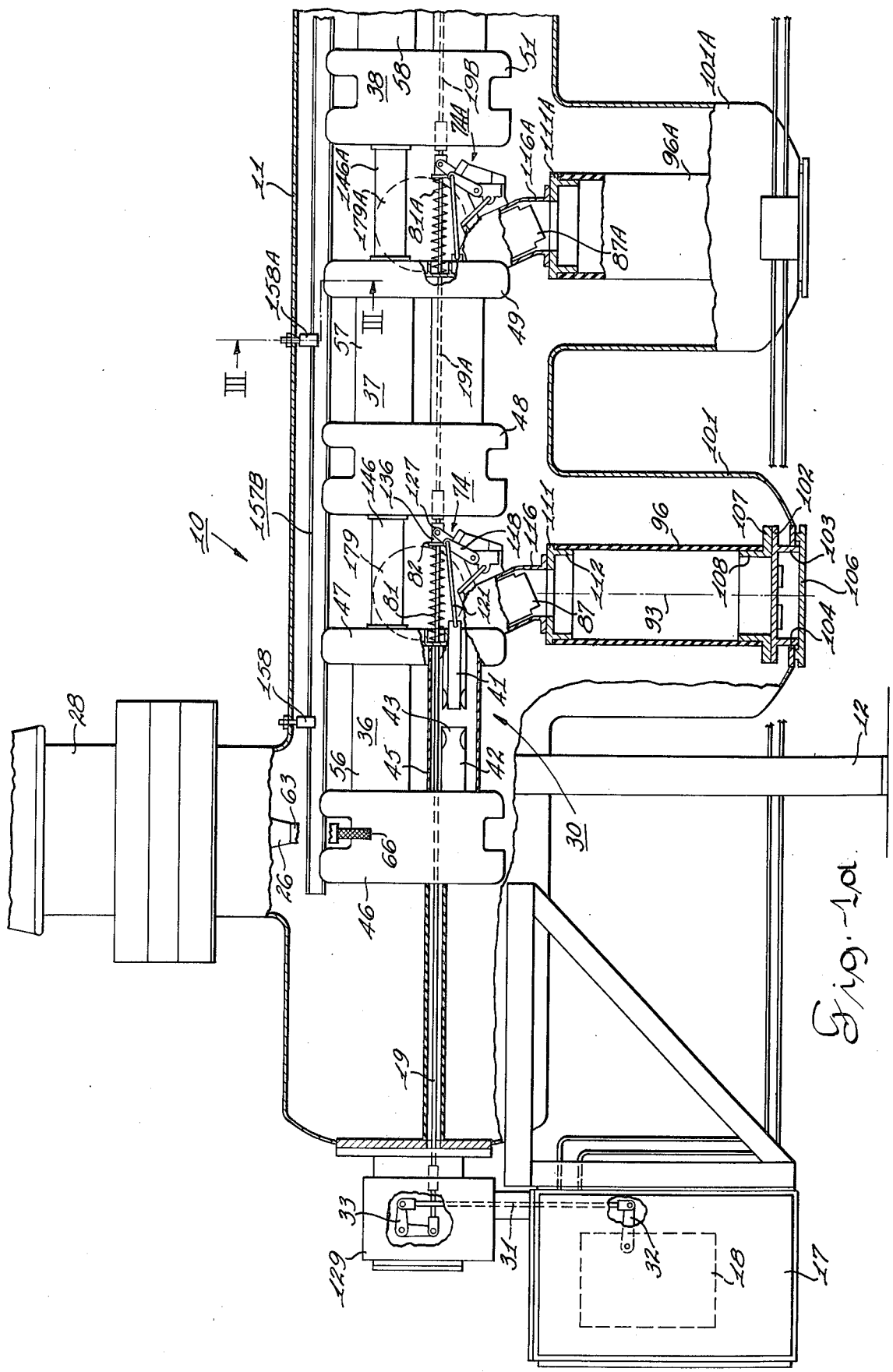

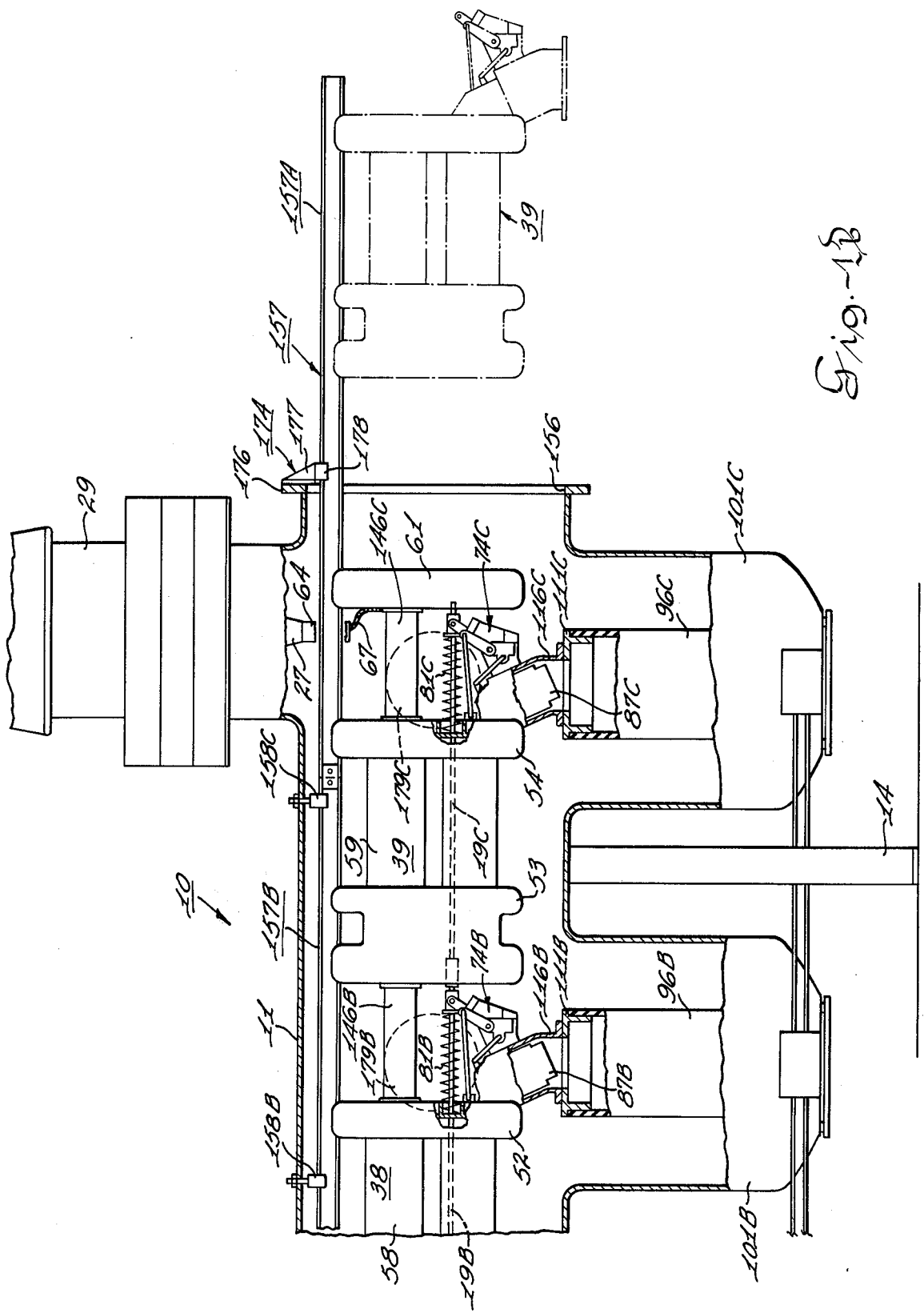

SINGLE TANK MULTIBREAKER CIRCUIT INTERRUPTER

This application is a continuation of application Ser. No. 635,158, filed Nov. 24, 1975 and now abandoned.

BACKGROUND OF THE INVENTION

This invention relates to gas insulated circuit breakers and, more particularly, to single enclosure multi-interrupter arrangements with associated operating mechanism all enclosed within the single enclosure.

A general object of the present invention is to provide an improved circuit breaker in which all of the circuit interrupters are contained within a single enclosure and the interrupters are supported within the enclosure by their own high pressure gas container.

A more specific object of the present invention is to provide an improved gas insulated circuit breaker particularly well suited for a multi-interrupter arrangement in which each interrupter has its individual high pressure gas container which also supports the interrupter in electrically isolated relationship within the enclosure.

Yet another object of the present invention is to provide an improved multi-interrupter gas insulated circuit breaker having improved means of inserting and withdrawing the interrupters from the enclosure.

In U.S. Pat. Nos. 3,852,548 and 3,852,549, assigned to the assignee of the instant application, there is disclosed a multi-interrupter single tank breaker in which the high pressure gas container is located externally of the enclosure. In the aforesaid patents, the interrupters are supported by a top sleeve and stabilized by an insulator sleeve which is in communication with the external high pressure gas container. In the construction disclosed in these patents, the interrupters receive the high pressure gas from a single container with the gas being diverted in opposite directions to the interrupters. Operation of the contacts and blast valves is effected by vertically arranged operating mechanism which is contained within a housing on the enclosure.

In U.S. Pat. No. 3,057,983, a gas insulated circuit breaker is disclosed in which a plurality of serially arranged interrupters are utilized. In the arrangement disclosed therein, the high pressure reservoir and a blast valve mechanism are disposed adjacent one end of the arc extinguishing assembly which bridges the space between spaced terminal bushings. Support of the interrupter assembly is obtained from the terminal bushings. The general operation of the above-identified interrupter is such that during the opening operation a single blast valve opens to allow the gas from the high pressure chamber to blast through a plurality of blast tubes and into the interrupting units. In other words, the interrupter furthest from the high pressure chamber is expected to receive its share of the gas blast as soon as the interrupter which is closest to the high pressure source receives its share.

In U.S. Pat. Nos. 3,007,021 and 3,852,549, structures for servicing the interrupters are disclosed. In the former patent, a monorail structure is utilized which, when used, is bolted to the lower end of the terminal bushings. This arrangement puts stress on the terminal bushings subjecting them to lateral forces which may inadvertantly damage them. Such damage that may occur could go unnoticed when removing or reinserting the interrupters within the enclosure. The damage may cause premature failure of the unit. As shown in the patent, the external end of the monorail requires a relatively massive A-frame to support the end of the monorail. In U.S. Pat. No. 3,852,549 assigned to the assignee of the present invention, there is disclosed an interrupter handling arrangement which includes a pair of spaced apart parallel rails on which the interrupters are guided into and out of the enclosure. This arrangement requires additional structure to be formed on the interrupter casting, which structure extends outwardly of the interrupter. This arrangement requires external supporting structure which is bolted to the access door flange. Both arrangements, while providing means for handling the relatively heavy interrupters, are massive and awkward to use especially in confined locations.

SUMMARY OF THE INVENTION

In accordance with the present invention, there is provided a gas insulated circuit breaker for high voltage rating. A single gas-tight enclosure accommodates a plurality of serially related interrupters each of which is supplied with high pressure gas from its own supply source. In addition, the supply source of each interrupter serves to support the interrupter in operative position within the enclosure. Operating means for operating the interrupter contacts and blast valves is provided within the sealed enclosure and is disposed substantially centrally of the interrupters to eliminate a substantial amount of linkage and provide substantially direct connections to the contact and valves. Servicing means to facilitate the removal and the insertion of the interrupters into the enclosure is also provided and so constructed as to insure that inadvertant damage to the interrupters and bushings will not occur as the interrupters are moved into and out of the enclosure.

DESCRIPTION OF THE DRAWINGS

FIGS. 1A and 1B taken together are a view partially in elevation and partially in vertical section through the gas insulated circuit breaker of the present invention;

DESCRIPTION OF THE INVENTION

Figure 2:
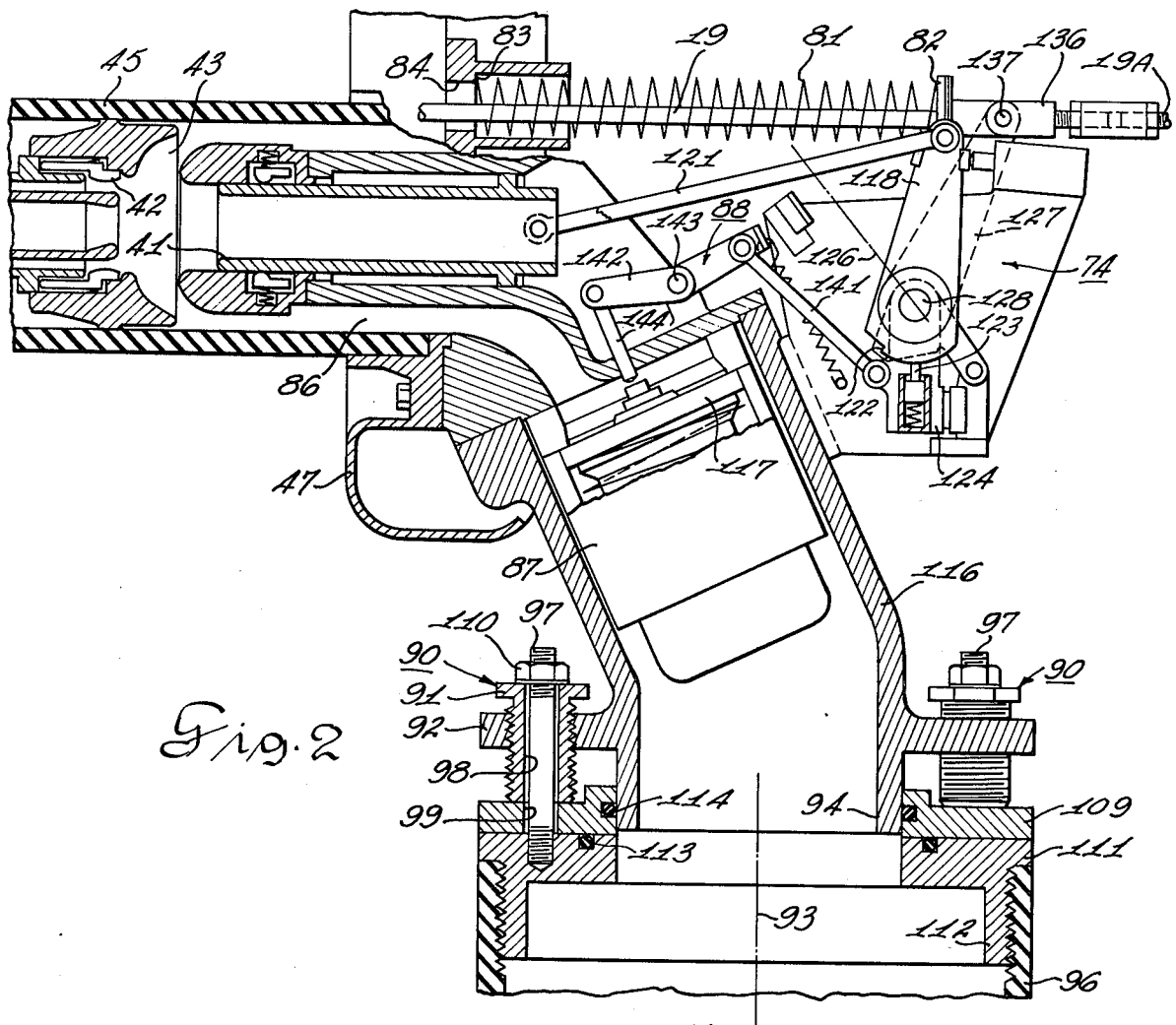
FIG. 2 is an enlarged view partly in vertical section and partly in elevation of a blast valve and pull-rod arrangement of one of the blast valves; and, FIG. 3 is a detail view partly in transverse vertical section and partly in elevation of the monorail handling system and associated arrangement for coupling the interrupter to the monorail.

Referring now to the drawing and more particularly to FIG. 1, the reference number 10 generally designates a single phase gas insulated circuit breaker. It will be understood for controlling three phases of a transmission system a circuit breaker 10 will be utilized for each phase of the system.

Generally, the circuit breaker 10 is a grounded tank or enclosure 11 which is adapted to be gas tight. The enclosure 11 is mounted on supports 12 and 14 which are welded or otherwise secured to longitudinally extending steel side beams (not shown).

Adjacent the left end of the enclosure 11 is an operating mechanism housing 17 in which, among other equipment, is an operating mechanism 18 of a suitable type. The operating mechanism 18 is operable upon a signal to effect longitudinal movement of an interconnected pull-rod 19 disposed within the enclosure 11 and extending parallel to the longitudinal axis of the enclosure. Terminal bushings 26 and 27 extend downwardly into the interior of the enclosure 11 through cylindrical supports 28 and 29, respectively.

The interior ends of the terminal bushings 26 and 27 are electrically connected to each end of an arc extinguishing assemblage 30 but do not support the assemblage 30.

The operating mechanism 18 within the housing 17 is operatively connected to the pull-rod 19 by means of a vertical rod 31, the lower end of which is pivotally connected to an operating lever 32 of the mechanism 18. The upper or opposite end of the vertical rod 31 is pivotally connected to one end of pivotal bell crank 33. The other end of the bell crank 33 is pivotally connected to the end of the pull-rod 19. The pull-rod 19 is arranged to effect the simultaneous movement of the contacts of the plurality of interrupters 36, 37, 38 and 39 in an opening and closing movement. The separation between the several movable contacts 41 and the relatively stationary contacts 42 draws a plurality of serially related arcs in the arcing area 43.

Each of the interrupters 36, 37, 38 and 39 generally comprises a pair of shield members such as a forward shield casting 46 and a rearwardly located shield casting 47 between which is secured an insulating cylindrical contact housing 45.

As shown, each of the interrupters 36, 37, 38 and 39 includes a pair of spaced end shields 46-47, 48-49, 51-52 and 53-54, respectively. The shields associated with each interrupter are carried in the ends of an insulator tube 56, 57, 58 and 59, respectively. At the right end of the interrupter assembly 39, an auxiliary shield 61 is provided which is secured to the interrupter 39 by means of an electrically conductive metallic tube 146C.

The interior ends 63 and 64 of the bushings 26 and 27 are electrically connected to the electrically conductive shields 46 and to the auxiliary electrically conductive shield 61 by flexible metallic conductors 66 and 67, respectively. The bridging metallic flexible conductors 66 and 67 do not serve as a support means for the interrupter asembly and, thus, no stresses are placed on the bushings 26 and 27.

Each of the interrupter units 36, 37, 38 and 39 are substantially similar and a description of the interrupter unit 36 will also apply to the other units 37, 38 and 39. Generally, the interrupter unit 36 comprises a relatively stationary contact structure 42, as previously mentioned, that is cooperable with the relatively movable tubular contact structure 41.

The plurality of movable contacts 41 of the several serially related interrupters are actuated between an open and a closed position by linkage means 74 operatively connected to the substantially centrally disposed longitudinally extending pull-rod 19. Each of the other interrupters also include pull-rods 19A, 19B and 19C, respectively. All of the pull-rods 19, 19A, 19B and 19C are releasably connected together so as to move as a single unit to effect the simultaneous operation of the associated movable contacts. As shown, the pull-rod 19 is operatively connected to the bell crank 33 associated with the operating mechanism 18. An acceleration spring 81 is mounted around the pull-rod 19 at the right-hand end thereof. The acceleration spring 81 is a compression spring having one end abutting an adjustable spring retainer 82. The opposite end of the acceleration spring 81, as shown in FIG. 2, abuts a bottom surface 83 of a recess that is formed around an opening 84 in the shield 47 through which the pull-rod 19 extends. Thus, operation of the operating mechanism 18 in a first mode will effect the movement of the pull-rods in a first direction to the left, as viewed in FIG. 1A-1B, to close the contacts of the interrupters and also charge the acceleration springs 81. When the operating mechanism 18 is tripped, the stored energy in the several acceleration springs 81 will be released to move the pull-rods in a second direction or to the right, as viewed in FIGS. 1A-1B, to effect the movement of the several contacts to open position thereby establishing a plurality of serially related arcs.

Extinction of the arcs drawn between the contacts of the several interrupters in the arcing area at the axial end of the movable contacts 41 is aided by means of a blast of high pressure gas to the arcing area 43. To this end, gas blast means is effective to provide a blast of high pressure gas to the arcing area through a passage 86, FIG. 2, surrounding the movable contact 41 to effect the rapid extinction of the arc.

The blast of high pressure gas is released by operation of a blast valve 87. The opening operation of the blast valve in synchronism with the opening of the contacts is accomplished by linkage 88. The linkage 88 is connected to the contact linkage 74 and operates in unison therewith upon movement of the ull-rod 19 in its second direction to open the contacts. As the contacts part, the several blast valves are opened so that a blast of gas at a relatively high pressure is directed to the arcing area via passages 86 to effect extinction of the arc drawn between the several movable contacts.

Associated with each of the interrupters 36, 37, 38 and 39 is a high pressure gas storage tank or chamber 96. The storage tanks each contain a volume of gas for its associated interrupter. Thus, each interrupter is an independent unit operating in synchronism with all the other interrupter units. The failure of one supply does not affect the remaining interrupters.

In addition, the storage tanks 96 operate to support the interrupters within the enclosure 11. The storage tank 96 is of an insulating material and is located within a depending enclosed extension 101 integrally formed or otherwise secured in gas-tight relationship from the bottom of the enclosure 11. The supporting gas pressure tanks 96 are each supported in the associated depending extension 101, 101A, 101B and 101C on a base 102. The base 102 is formed with a circular depending flange 103 that is received within a circular collar 104 that is welded to a bottom opening in the extensions 101. A closure plate 106 is secured in gas-tight relationship to the collar 104. A circular centering collar 107 having an axial extending sleeve portion 108 is sealed in gas-tight relationship on the base 102. The cylindrical storage gas tank 96 is adapted to engage around the sleeve portion 108 of the centering collar 107 and is sealed thereon by suitable means (not shown). The upper end of the cylindrical insulator storage tank 96 receives a blast valve support casting 111. The casting 111 is formed with a depending circular sleeve portion 112 which is adapted to engage in the upper end of the cylindrical tank 96. Suitable sealing means (not shown) provides a gas tight seal between the sleeve portion 112 and the inner surface of the tank 96. A sealing and centering ring 109 serves to receive and center the blast valve housing 116 in proper operating position and also to prevent leakage of high pressure gas from the storage tanks 96. To this end, the sealing and centering ring 109 is disposed on the support casting 111 and receives the lower end of the blast valve casting 116. An O-ring 113 is operable to seal the joint surfaces between the centering ring 109 and the support casting 111. Another O-ring 114 seals the joint space between the housing 116 and the ring 109.

To secure the centering ring 109 and the housing 116 in position on the support casting 111, there is provided a plurality of fasteners such as the bolt assembly 90. The bolt assembly 90 comprises an outer threaded member 91 having a bore threadedly engaged in a suitable threaded opening provided in a radial flange 92 of the housing 116. The threaded member 91 is adapted to engage the surface of the centering ring 109. Thus, by adjusting the threaded member 91 selectively, a desired vertical orientation of the valve housing 116 with respect to a vertical line 93 which extends through the outer housing opening 94 may easily be achieved.

A threaded stud 97 extends through the bore 98 of each threaded member 91 and also through an opening 99 formed in the centering ring 109. The stud 97 is threadedly engaged in support casing 111. A nut 110 threadedly engaged on the outer or upper end of the stud 97 operates to effectively secure a blast valve housing 116 in its adjusted position. It will be noted that the stud 97 has a diameter which is less than the diameters of bore 98 and opening 99. This arrangement provides for radial adjustment of the blast valve housing 116 and the ring 109 relative to the support casting 111. With this arrangement, an adjustment of the blast valve casting 116 can be effected radially in a horizontal plane and also vertically relative to a vertical axis. Thus, mating of the blast valve housing 116 with the contact assembly and shield 47 and with the storage tank 96 can be easily and quickly accomplished.

As shown in FIG. 2, the blast valve 87 is operatively disposed within the housing portion 116. Within the housing 116, a displaceable valve member 117 is resiliently urged in a normal sealing position to close the passage 86 until such time as it is displaced to allow a blast of gas at a relatively high pressure to be delivered via the passage 86 to the arcing area. Operation of the movable contact 41 and the valve member 117 is effected by movement of a crank 118.

In FIG. 2, the crank 118 is shown in a position after it has operated to move the contact 41 to open position and to release the blast valve member 117 for return to its normal closed position. When the crank 118 is pivoted in the counterclockwise direction, a link 121 forces the contact 41 leftwardly into a closed position. At the same time, a cam notch 122 formed on the lower end of the crank 118 is moved into a position to the right of a displaceable tongue 123 in a latch body 124. Thus, with the crank 118 positioned leftwardly into a position indicated by the broken line 126, the movable contact 41 will have been moved to a closed position and the latch cam notch 122 will be connected to the latch 124 in readiness for an opening operation of the contact 41 and of blast valve member 117.

Movement of the crank 118 for operating the contact 41 to a closed position, or for the simultaneous operation of the contact 41 and the blast valve 117 to open positions, is effected by means of the pull-rod 19. The pull-rod 19 at its right end, as viewed in FIG. 2, has a pivotal connection with the upper end of an operating crank 127. The operating crank 127 is secured to a horizontal shaft 128 on which the crank 118 and latch body 124 are mounted. The latch body 124 is mounted on the shaft 127 to rotate relative to the shaft. On the other hand, the crank 118 is secured to the shaft 128 so as to be driven by the rotation of the shaft. Thus, pivotal movement of the operating crank 127 in a counterclockwise direction will effect rotation of the shaft 128 which, in turn, causes the pivotal movement of the crank 118 in a counterclockwise direction moving the contact 41 to a closed position and coupling the notch 122 with the latch tongue 123. As the pull-rod 19 moves leftwardly to effect the closing of the contact 41, acceleration spring 81 mounted about the pull-rod 19 is compressed or charged for a subsequent operation in a contact opening movement. As shown in FIG. 1, pull-rod 19 extends to the left and is pivotally connected to the bell crank 33 within an end box 129. The opposite end of the bell crank 33 is pivotally connected to the vertical rod 31, the lower end of which is pivotally connected to an operating lever 32 of the operator 18.

The operating crank 127 is connected to the enlarged end 136 of the pull-rod 19 by means of a pin 137. Thus, axial movement of the pull-rod 19 will effect arcuate movement of the operating crank 127. This arcuate movement of the crank 127, in turn, effects rotation of the shaft 128 thereby moving the lever arm 118 to effect movement of the contact 41. As previously mentioned, movement of the lever 118 from its broken line position 126, which is a contact closed position, to the position that it occupies in FIG. 2, which is the contact open position, will also effect movement of the latch body 124 in a clockwise direction. This movement moves a connecting link 141 axially to effect counterclockwise movement of an arm 142 about a pin 143. An actuating pin 144 secured to the opposite end of the arm 142 is then moved axially into engagement with the blast valve 117 to displace the valve. As a result, a blast of gas under relatively high pressure is delivered to the arcing area 43 via the passage 86.

As previously mentioned, the pull-rods 19, 19A, 19B, and 19C associated with the interrupters 36, 37, 38 and 39, respectively, are connected together to move as a single pull-rod assembly. The movement of the pull-rod assembly in a contact closing movement is leftwardly, as viewed in FIGS. 1A–1B, which is accomplished by the operating mechanism 18. Thus, in a closing movement the pull-rod assembly is under tension. In a contact opening movement, the pull-rod assembly is moved rightwardly under the influence of the acceleration springs 81, 81A, 81B and 81C. Thus, in an opening movement, the pull-rod assembly is also under tension. Since each of the interrupters 36, 37, 38 and 39 is solely supported by its high pressure gas storage tank 96, a means is provided to tie the interrupters to each other in the direction in which the pull-rods move. This relieves some of the forces on the left ends of the interrupters which is due to the weight of the relatively large shield castings and which is also partially due to the cantilever construction of the contact structure relative to the blast valve unit. Also, impact forces from the opening and closing operation of the contacts will be resisted.

To this end, a series of axially aligned metallic tubes 146, 146A, 146B and 146C are provided. The metallic tube 146 extends between and is secured to the shield members 47 and 48 and serves to resist shock loads imposed upon the interrupter 36 occasioned by the operation of pull-rod 19. In addition, the metallic tube 146 electrically connects the interrupter 36 in series with the interrupter 37. In a similar manner, the metallic tubes 146A, 146B and 146C are secured between the shield members 49-51, 52-53 and 54-61, respectively, resisting shock loads imposed on the interrupters 37, 38 and 39, respectively. These metallic tubes also serve to electrically connect the respective interrupters together in series relationship. Thus, with all interrupters in closed condition, an electric circuit is established from bushing 26 to bushing 27 via the conductor 66, shield 46, contacts 41-42 of the interrupter 36, shield 47, metallic tube 146, shield 48, contacts 41A-42A of interrupter 37, shield 49, tube 146A, shield 51, contacts 41B-42B of interrupter 38, shield 52, tube 146B, shield 53, contacts 41C-42C of the interrupter 39, tube 146C, shield 61, flexible conductor 67 and thence to bushing 27.

It is necessary to assemble and service the interrupter units 37, 38, 39 and 40 exteriorly of the enclosure 11. To facilitate the withdrawal and insertion of the units out of and into the enclosure, the enclosure 11 at the right-hand end thereof, as viewed in FIG. 1B, is provided with an access opening 156 sealable in gas-tight relationship by a door (not shown). With the door (not shown) opened, an I-beam assembly 157, which in the particular illustration comprises several I-beam sections 157A and 157B, is inserted into the enclosure 11. To receive and support the I-beam assembly within the encluse 11, a plurality of rail supports 158, 158A, 158B and 158C are provided. The enclosure rail support 158 is exemplary of all of the rail supports and the description of the support 158 will apply to all.

Figure 3:
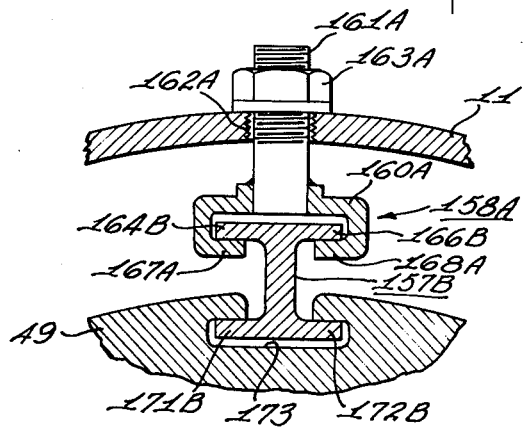

As shown in FIG. 3, the rail support 158A includes a threaded stud 161A which is received in a suitable opening 162A formed in the enclosure 11. The lower or inner end of the threaded stud 161A is provided with a retainer 160A which in cross-section presents a C-shaped configuration. The retainer 160A is welded or otherwise secured to the lower or inner end of the stud 161A. A nut 163A threaded on the external threaded end of the stud 161A adjustably maintains the stud retainer in an adjusted operative position. The I-beam or rail 157B is slidably insertable into the retainer 160A in a manner in which the upper flanges 164B and 166B of the rail are slidably supported on the inwardly facing flanges 167A and 168A of the retainer 160A.

The lower flanges 171B and 172B of the rail engage in a inverted T-slot 173 integrally formed in the top portion of the shield 49. As shown in FIG. 3, the inverted T-slot 173 is moulded in each of the shield castings associated with each interrupter through which the lower flanges of the rail 157B engage to support the interrupters for movement into and out of the enclosure 11. As shown in FIG. 3, the moulded inverted T-slots have smooth contours to reduce corona effect. Thus, the upper surfaces of the flanges 171B and 172B engage with the lower surfaces of the lips of the T-slot 173 to effectively support the shield casting 49.

Exteriorly of the enclosure 11 is a support and guide means 174 that are bolted to the flange 176 of the enclosure 11 to which the closure door (not shown) is bolted. The guide and support means comprise a bracket 177 to the bottom surface of which is secured a C-shaped rail support 178 similar to the retainers 160.

Servicing of the interrupters is accomplished exteriorly of the enclosure 11. Thus, after the insulating gas from the enclosure 11 and the high pressure tanks 96, 96A, 96B and 96C has been withdrawn, the closure door (not shown) at the right-hand end of the closure 11 is removed and the exterior guide 174 is bolted into position. The rail assembly is then inserted into the exterior guide 174 and slidably inserted into the enclosure being engaged in the T-slots 173 formed in the several shields. As the end of the I-beam reaches the depending guides 158, the upper flanges of the rail are engaged in the retainer. With the rail assembly 157 fully inserted into position within the enclosure 11, the blast valve housing 116C is disconnected from the support plate 111C. To disconnect the blast valve housing 116C from its associated support plate 111C, access to the interior of the enclosure is provided by means of ports 179, the off-side ports being shown in broken lines. Each off-side port 179 is complemented by a similar port located on the near side of the enclosure and in a position which is relative to the position of the associated off-side port. Thus, access to the interior of the enclosure 11 from the exterior of the enclosure is accomplished. With the blast valve housing 116C disconnected from its associated support plate 111C, the pull-rod 19C is disconnected from the adjacent pull-rod 19B. This is accomplished through ports 179B. Thereafter, the left-hand end of the thrust tube 146C is unbolted from the shield 54. The conductor 67 is also disconnected from the auxiliary shield 61. With the disconnecting of the several members accomplished, the interrupter 39 may be easily withdrawn from the enclosure 11 by sliding it outwardly thereof along the rail to the position indicated by the broken line of the interrupter outside of the enclosure. It will be appreciated that all or any number of the interrupters may be removed as may be found necessary or desirable.

The embodiments of the invention in which an exclusive property or privilege is claimed are defined as follows:

1. A multi-interrupter gas insulated circuit breaker;
   a grounded enclosure having an insulating gas at a relatively low pressure therein;
   a high pressure gas storage tank having insulating gas at relatively high pressure therein for each of the interrupters, said storage tanks being supported in a vertical plane within said enclosure
   a forward shield casting and a rearwardly disposed shield casting; associated with each interrupter;
   an insulating cylindrical contact housing for each of said interrupters horizontally disposed within said enclosure and secured between associated forward and rearward shield castings, said housing operating to enclose an associated interrupter;
   a blast valve associated with each interrupter and connected to an associated high pressure gas storage tank, said blast valve including an angular housing in which said blast valve is disposed, said housing being operably connected between an associated interrupter housing and an associated high pressure gas storage tank to provide a gas flow path therebetween, said blast valve being normally operable to block the flow of high pressure gas from said high pressure storage tank, said blast valve being operable when actuated to release a blast of high pressure gas from the storage tank and said housing operates to direct the blast of high pressure gas to the arcing area of the associated interrupter confined within said contact housing;
   a movable operating means within said enclosure and extending through said cylindrical contact housings and said shields associated with said interrupters and operably connected to effect the simultaneous operation of all of said interrupters and all of said blast valves to effect arc extinctions at said interrupters as the interrupters are operated to open positions; and,
   means extending between said rearward shield casting and the forward shield casting of adjacent interrupters and operable to relieve a portion of the forces acting on the free unsupported ends of said interrupters due to the weight of said shield castings acting on the cantilevered interrupters.

2. A gas insulated circuit breaker according to claim 1 wherein said enclosure is provided with a service opening;
- a plurality of spaced apart depending hangers carried by said enclosure in a line above said interrupters;
- a rail member having a generally I-configuration in cross-section insertable through said enclosure service opening, said rail member being engageable with said hangers as it is inserted into said enclosure in a manner to effect the suspension of said rail member over said interrupters; and,
- connecting means which in cross-section has a configuration of an inverted T moulded in each of said shield castings associated with each interrupter to provide openings through which the lower flange portion of said rail member may engage to support said interrupters from said enclosure for movement into and out of said enclosure, said connecting means having smooth contours to reduce corona effect;
- whereby the insertion and withdrawal of said interrupters into and out of said enclosure through said opening is facilitated by guided movement along said rail member.

* * * * *